R. KROEDEL.
FILM WINDING MECHANISM.
APPLICATION FILED OCT. 12, 1917.
1,335,742.
Patented Apr. 6, 1920.
2 SHEETS—SHEET 1.
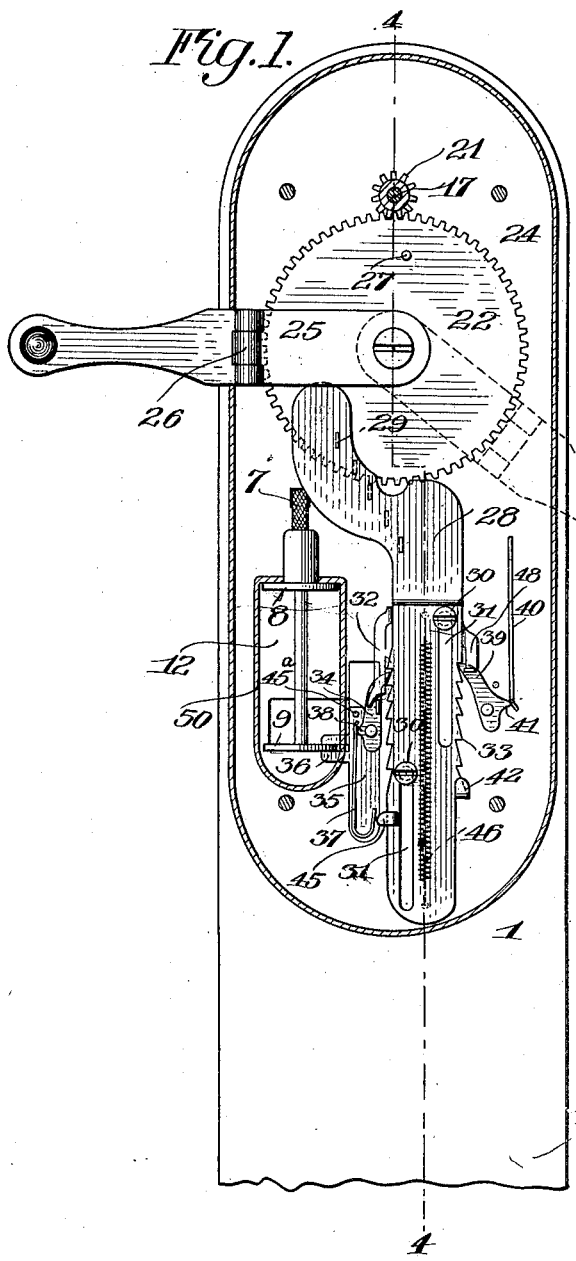
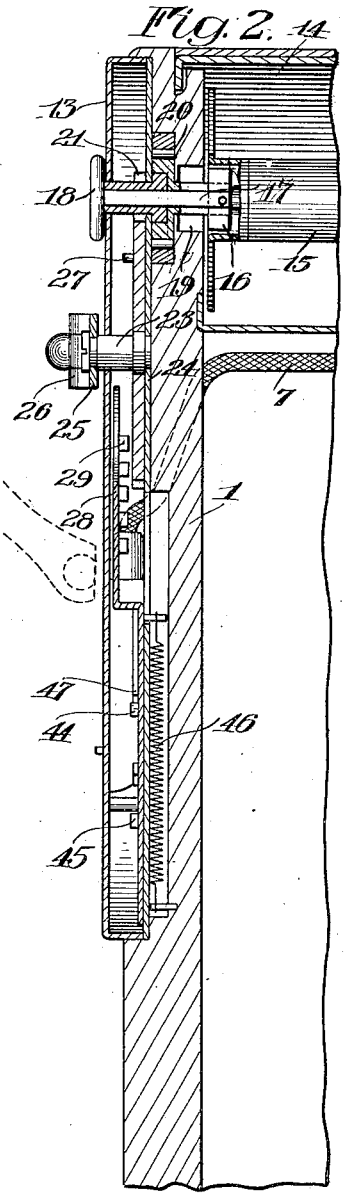
WITNESSES:
INVENTOR.
Robert Kroedel
BY
his ATTORNEYS.

R. KROEDEL.
FILM WINDING MECHANISM.
APPLICATION FILED OCT. 12, 1917.

1,335,742.

Patented Apr. 6, 1920.
2 SHEETS—SHEET 2.

WITNESSES:

INVENTOR.
Robert Kroedel
BY
his ATTORNEYS.

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FILM-WINDING MECHANISM.

1,335,742.  Specification of Letters Patent.  Patented Apr. 6, 1920.

Application filed Ocotber 12, 1917. Serial No. 196,167.

*To all whom it may concern:*

Be it known that I, ROBERT KROEDEL, of Rochester, in the county of Monroe and State of New York, have invented certain new and useful Improvements in Film-Winding Mechanisms; and I do hereby declare the following to be a full, clear, and exact description of the same, reference being had to the accompanying drawings, forming a part of this specification, and to the reference-numerals marked thereon.

My present invention relates to photography and more particularly to photographic film cameras and it has for its object to provide a simple and efficient film feeding mechanism for cameras or roll holders providing means for quickly winding the successive picture areas of the strip into and out of the field of exposure without having recourse to the usual sight aperture for keeping track of the progress of the film. In other words, the practice of my invention provides for automatically measuring off the film for each exposure. To these and other ends, the invention resides in certain improvements and combinations of parts all as will be hereinafter more fully described, the novel features being pointed out in the claims at the end of the specification.

In the drawings:

Figure 1 is an enlarged view of the film winding mechanism taken in section through its casing in a plane parallel with the camera wall, and showing the mechanism in its initial position;

Fig. 2 is a section taken substantially on the line 4—4 of Fig. 1;

Similar reference numerals throughout the several views indicate the same parts.

Figure 3:
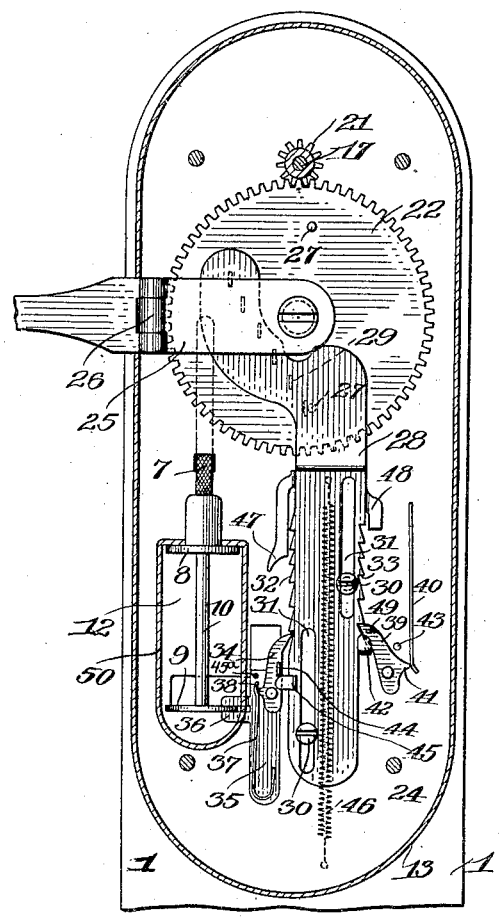
Fig. 3 is a view similar to Fig. 1 with the parts in the position occupied when the last picture area of the film is in position for exposure.

The camera in connection with which I have illustrated my invention (and only a fragment of which is shown) is of the familiar folding pocket type comprising a body 1 and a shutter (not shown) of any desired kind but preferably operable through the medium of the well known cable release the casing of which is indicated at 7 in the figures. In the present instance, the said casing 7 terminates in a fixed thumb piece 8 secured to the side wall of the body 1 while a movable finger piece 9 is connected to the extremity of the cable 10 that lies within the casing and acts as a thrust member against the shutter tripping mechanism. The casing 7 leads through the wall of the body 1 and across the bellows chamber being connected to the shutter casing in the usual manner. Pinching together the finger pieces 8 and 9 operates the shutter. It is not believed that further explanation of the foregoing structures, well known to those skilled in the art, is required.

The finger pieces 8 and 9 project through an opening 12 and a casing 13 secured to the exterior of a wall of the body 1 and within this casing is housed the winding mechanism. The usual film roll chamber 14 containing a film spool 15 upon which the film is wound from the supply spool (not shown) is shown in Fig. 2. The slotted end of the spool 15 is engaged for turning by the head 16 of a winding key 17 that is provided with a button 18 extending through and accessible from the exterior of the casing 13. By withdrawing the key by means of the button 18, the spool 15 can be released, the head 16 going into a recess 19. The usual friction clutch mechanism 20 permits the key 17 to turn only in the winding direction.

Fixed to the key 17 is a pinion 21 meshing with a large gear 22 fixed to a shaft 23 having a bearing in the casing 13 and in a base plate 24. The shaft and gear are turned by a crank 25 secured to the projecting end of the former and preferably this crank is adapted to fold, being formed with a hinge 26 at an intermediate point. Turning the crank to the right winds the film, the key 17 turning to the left.

A given number of revolutions of the key 17 will wind up one picture area of the film but as the roll on the spool 15 increases in size it, of course, draws off more film per revolution and fewer revolutions must be progressively made as the exposures increase. To take care of this variation I provide an abutment 27 on the gear 22 and a stop member 28 on the base plate 24. The stop member carries a plurality of stepped stops 29 equal in number to the exposures or picture areas of the film strip and adapted to be successively advanced into the path of the abutment 27. The stop member 28 is reciprocatory and slides upon guidepins 30 to receive which it is slotted at 31. It is toothed on opposite sides providing racks 32 and 33 having teeth equal in number to the stops 29. Coöperating with the rack 32 is a pawl 34 carried on a suitably guided slide 35. An ear 36 on this slide is bifurcated to interlock with the finger-piece 9. Each time the shutter is operated the pawl 34 advances the stop member 28 one tooth and moves another stop 29 into the path of abutment 27.

The initial position of the parts before the first exposure is shown in Fig. 1. As the finger-piece 9 is moved toward the finger-piece 8 to make the first exposure, the pawl 34 engaging the first tooth 32 moves the member 28 so that the first stop 29 thereon is in the path of the abutment 27. The crank 25 is now turned until the abutment is against that stop and the exposed picture area is wound off and a new one drawn into the field of exposure. The crank 25 is returned to the left which is an idle movement with respect to the key 17 and spool 15 on account of the clutch 20. On the next operation of the shutter the pawl 34 moves the member 28 another tooth and so on. The pawl 34 is held in engagement with the rack 32 by a leaf spring 37 engaging a lug 38 thereon. After this pawl has advanced the member 28 and it and its slide 35 return with the finger-piece 9, the member 28 is held in its advanced position by a pawl 39 held in engagement with rack 33 by a leaf spring 40 engaging a lug 41 on the pawl. This pawl 39 and its spring 40 are mounted on the base plate 24.

Figure 4:
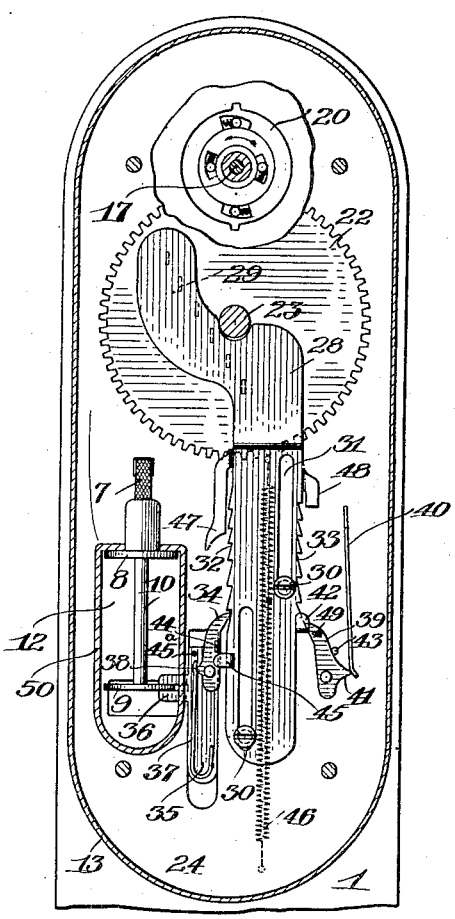
Fig. 4 is a similar view showing the manner in which the winding device is reset.
Figure 5:
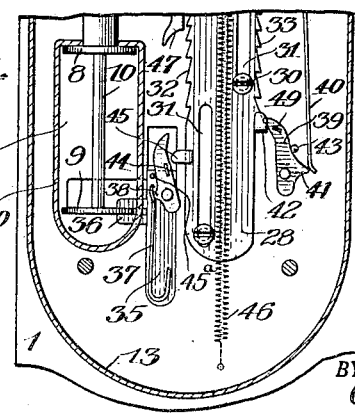
Fig. 5 is a fragmentary view similar to Figs. 3 and 4 showing the position assumed just before the initial position of Fig. 1 is reached.

In Fig. 3 is shown the position of the parts when the last picture area has been drawn into the field of exposure but before the shutter has been operated to make the exposure. As the shutter is operated, the positions of Fig. 4 are assumed and at this point a cam 42 at the base of rack 33 throws out holding pawl 39 and this pawl is held out against the stop pin 43 because the point of contact between its spring 40 and its lug 41 has passed to the other side of its pivotal center. Then, as lifting pawl 34 returns under the influence of the spring that returns the finger piece 9, an ear 44 on the pawl engages a trip 45 on the stop member 28 at the base of rack 32 and this pawl is also thrown out against a stop pin 45ᵃ. The stop member 28 is returned by a spring 46 but its movement is sluggish as compared with the pawl 34, slide 35 and finger-piece 9 all of which are returned ahead of it to the temporary position shown in Fig. 5. Then, as the stop member 28 is drawn down into place by its spring, an abutment 47 thereon engages the ear 44 on pawl 34 and throws it back into engagement with the rack 32 while a similar abutment 48 engages an ear 49 on pawl 39 and moves it back into engagement with rack 33, all as shown in Fig. 1, and the device is ready for another set of exposures.

In the present instance, provision is made for six exposures. Only five stops 29 are shown, however, because the first picture area is positioned by observation which makes accurate the positioning of the other five automatically by means of the stop.

The margin of the opening 12 in the casing 13 is preferably flanged inwardly at 50 against the base plate 24 so that only the finger-pieces are exposed and the extension 36 of the slide 35 operates in a slot in this flange.

I claim as my invention:

1. In a film winding device for cameras, the combination with a winding roll and winding mechanism operatively connected therewith and embodying a rotary element having an abutment thereon, of a stop member having a plurality of stepped stops thereon adapted to be moved successively across the face of the rotary element into the path of the abutment.

2. In a film winding device for cameras, the combination with a winding roll and winding mechanism operatively connected therewith and embodying a rotary element having an abutment thereon, of a reciprocatory stop member having a plurality of stepped stops thereon adapted to be moved successively into the path of the abutment upon a sliding movement of the stop member in one direction across the face of the rotary element.

3. In a film winding device for cameras, the combination with an operating member, a winding roll and winding mechanism operatively connected therewith and embodying a rotary element having an abutment thereon, of a stop member having a plurality of stepped stops thereon adapted to be moved successively across the face of the rotary element into the path of the abutment and a pawl actuated by the operating member and coöperating with the stop member to advance it intermittently.

4. In a film winding device for cameras, the combination with a winding roll and winding mechanism operatively connected therewith and embodying a rotary element having an abutment thereon, of a reciprocatory toothed stop member having a plurality of stops thereon adapted to be moved successively into the path of the abutment, a pawl coöperating with the stop member to advance it, an actuator therefor, means for returning the stop member and means on the latter for automatically throwing out the pawl after a predetermined number of actuations thereof.

5. In a film winding device for cameras, the combination with a winding roll and winding mechanism operatively connected therewith and embodying a rotary element having an abutment thereon, of a reciprocatory toothed stop member having a plurality of stops thereon adapted to be moved successively into the path of the abutment, a pawl coöperating with the stop member to advance it, an actuator therefor, means for returning the stop member, means for returning the pawl after the last actuation thereof in advance of the return of the stop member, means on the latter for throwing out the pawl before the return of the stop member after a predetermined number of actuations of the pawl, and means on the stop member for throwing in the pawl upon the completion of the return movement of the stop member.

6. In a film winding device for cameras, the combination with a winding roll and winding mechanism operatively connected therewith and embodying a rotary element having an abutment thereon, of a reciprocatory toothed stop member having a plurality of stops thereon adapted to be moved successively into the path of the abutment, a pawl coöperating with the stop member to advance it, an actuator therefor, a holding pawl also coöperating with the stop member, means for returning the latter, means for returning the advancing pawl after the last actuation thereof in advance of the return of the stop member, means on the latter for throwing out both of the pawls before the return of the stop member after a predetermined number of actuations of the advancing pawl and means on the stop member for throwing in both pawls upon the completion of the return movement of the stop member.

ROBERT KROEDEL.

Witnesses:
HELEN M. FRASER,
MARGARET DUIGNAN.